US009511679B2

(12) United States Patent
Izumi (10) Patent No.: US 9,511,679 B2
(45) Date of Patent: Dec. 6, 2016

(54) VEHICULAR CONTROL DEVICE AND METHOD

(75) Inventor: Junta Izumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/702,937

(22) PCT Filed: Jun. 23, 2010

(86) PCT No.: PCT/JP2010/060647
§ 371 (c)(1),
(2), (4) Date: Dec. 7, 2012

(87) PCT Pub. No.: WO2011/161780
PCT Pub. Date: Dec. 29, 2011

(65) Prior Publication Data
US 2013/0090797 A1    Apr. 11, 2013

(51) Int. Cl.
| | | |
|---|---|---|
| B60W 20/00 | (2016.01) | |
| B60W 10/08 | (2006.01) | |
| B60W 10/06 | (2006.01) | |
| B60L 11/18 | (2006.01) | |
| B60L 11/12 | (2006.01) | |
| B60L 11/14 | (2006.01) | |

(Continued)

(52) U.S. Cl.
CPC .......... *B60L 11/1861* (2013.01); *B60L 11/123* (2013.01); *B60L 11/14* (2013.01); *B60L 11/1816* (2013.01); *B60L 11/1887* (2013.01); *H01M 10/44* (2013.01); *H02J 7/0013* (2013.01); *H02J 7/041* (2013.01); *H02J 7/044* (2013.01); *B60L 2210/14* (2013.01); *B60L 2210/40* (2013.01); *B60L 2240/421* (2013.01); *B60L 2240/423* (2013.01); *B60L 2240/545* (2013.01); *Y02T 10/6217* (2013.01); *Y02T 10/642* (2013.01); *Y02T 10/7005* (2013.01); *Y02T 10/7055* (2013.01); *Y02T 10/7072* (2013.01); *Y02T 10/7077* (2013.01); *Y02T 10/7225* (2013.01); *Y02T 10/7241* (2013.01); *Y02T 90/127* (2013.01); *Y02T 90/14* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 8,648,565 B2 * | 2/2014 | Mitsutani | ............ 320/109 |
| 2008/0048846 A1 | 2/2008 | Nagai et al. | |

(Continued)

FOREIGN PATENT DOCUMENTS

| | | |
|---|---|---|
| JP | A-2002-280080 | 9/2002 |
| JP | A-2006-304393 | 11/2006 |

(Continued)

*Primary Examiner* — John R Olszewski
*Assistant Examiner* — James M McPherson
(74) *Attorney, Agent, or Firm* — Oliff PLC (57) ABSTRACT

An ECU executes a program including the steps of: performing shipping electric charging control when an electric charging plug is connected and a condition is also established for performing the shipping electric charging control; and if the condition for performing the shipping electric charging control is not established, performing full electric charging control.

6 Claims, 6 Drawing Sheets

(51) Int. Cl.
 *H01M 10/44* (2006.01)
 *H02J 7/00* (2006.01)
 *H02J 7/04* (2006.01)

(56) References Cited

U.S. PATENT DOCUMENTS

| | | | |
|---|---|---|---|
| 2009/0015193 A1 | 1/2009 | Esaka et al. | |
| 2009/0101421 A1* | 4/2009 | Oyobe et al. | 180/65.29 |
| 2009/0107743 A1* | 4/2009 | Alston et al. | 180/65.21 |
| 2009/0123739 A1 | 5/2009 | Saitou et al. | |
| 2009/0210357 A1* | 8/2009 | Pudar et al. | 705/412 |
| 2010/0019729 A1* | 1/2010 | Kaita et al. | 320/134 |
| 2010/0072953 A1* | 3/2010 | Mitsutani | 320/152 |
| 2010/0181829 A1 | 7/2010 | Ichikawa et al. | |
| 2010/0230188 A1* | 9/2010 | Nguyen | 180/65.1 |
| 2010/0274570 A1* | 10/2010 | Proefke et al. | 705/1.1 |
| 2014/0005872 A1* | 1/2014 | Teraya | 701/22 |

FOREIGN PATENT DOCUMENTS

| | | |
|---|---|---|
| JP | A-2006-325317 | 11/2006 |
| JP | A-2007-246589 | 9/2007 |
| JP | A-2008-45374 | 2/2008 |
| JP | A-2009-033785 | 2/2009 |
| JP | A-2009-137456 | 6/2009 |
| JP | A-2009-254221 | 10/2009 |

\* cited by examiner

VEHICULAR CONTROL DEVICE AND METHOD

TECHNICAL FIELD

The present invention relates to controlling a vehicle having mounted therein a battery electrically chargeable from an external power supply, and particularly to controlling electrically charging using an external power supply and implemented for a battery mounted in a vehicle.

BACKGROUND ART

Conventionally, a hybrid vehicle, a fuel-cell vehicle, an electric vehicle and the like that travels by the driving force provided from a motor attract an attention as one approach to environmental issues. Such a vehicle has a battery mounted therein for supplying the motor with electric power. However, leaving such a battery for a long period of time with a large state of charge promotes its degradation.

In view of such an issue, Japanese Patent Laying-Open No. 2006-304393 (Patent Literature 1) discloses a power supply device including a plurality of batteries having different characteristics, that allows the batteries' characteristics to be considered to allow the batteries to be in better states to reduce their degradation. This power supply device is a power supply device externally receiving electric power and supplying external electric power consuming equipment therewith, and includes: a first electrically chargeable and dischargeable battery having a first characteristic; a second electrically chargeable and dischargeable battery having a second characteristic different from the first characteristic; a voltage adjustment means that can adjust a first voltage that is a voltage of a first voltage system having the first battery connected thereto and a second voltage that is a voltage of a second voltage system having the second battery connected thereto; a first state detection means that detects the state of the first battery; and a control means that controls the voltage adjustment means so that the first battery and the second battery communicate electric power therebetween to allow the first battery to be in a good state based on the state of the first battery, as detected by the first state detection means, when the power supply device does not receive electric power externally. The power supply device disclosed in the above publication allows a battery to be in a better state.

CITATION LIST

Patent Literature

PTL 1: Japanese Patent Laying-Open No. 2006-304393

SUMMARY OF INVENTION

Technical Problem

A battery mounted in a vehicle and electrically fully charged from an external power supply may thereafter not be used and may thus be left in the electrically fully charged state. It may be done so for example when the user does not drive the vehicle for a long period of time after the battery is electrically fully charged or when a vehicle having a battery electrically charged in a factory shipment stage is thereafter delivered, shipped or the like over a long period of time before the vehicle is received by the user, and the battery may thus be left in the electrically fully charged state for a long period of time and thus further degrade.

The above publication discloses the power supply device without considering such an issue, and cannot solve the issue.

The present invention has been made to overcome the above disadvantage, and it contemplates a vehicular control device and method preventing further degradation of a battery mounted in a vehicle.

Solution to Problem

The present invention in one aspect provides a vehicular control device mounted in a vehicle including a rotating electric machine serving as a driving source, a plurality of power storage devices for supplying the rotating electric machine with electric power, and an electric charging device for electrically charging the plurality of power storage devices from an external power supply. The plurality of power storage devices are connected in parallel. The vehicular control device includes: an input unit for inputting an instruction; and a control unit. The control unit performs first electric charging control for electrically charging the plurality of power storage devices to have a state of charge to attain an electrically fully charged state when the external power supply is connected to the electric charging device. The control unit performs second electric charging control rather than the first electric charging control when the external power supply is connected to the electric charging device and in addition an instruction is input to the input unit for performing the second electric charging control. The second electric charging control is electric charging control using the external power supply to electrically charge the plurality of power storage devices to each have a state of charge equal to a threshold value smaller than an upper limit value set for a state of charge corresponding to the electrically fully charged state.

Preferably, when the external power supply is connected to the electric charging device and in addition the instruction is input to the input unit for performing the second electric charging control, the control unit uses the external power supply to start electrically charging a first power storage device of the plurality of power storage devices, and when the first power storage device attains a state of charge equal to or larger than the threshold value, the control unit uses the external power supply to electrically charge a second power storage device different from the first power storage device to attain a state of charge equal to or larger than the threshold value.

Still preferably, the input unit includes a brake pedal, and a detection unit for detecting an amount of an operation of the brake pedal. The control unit performs the second electric charging control when the external power supply is connected to the electric charging device, and, in addition, how many times the brake pedal is depressed and released repeatedly for a predetermined period of time is a predetermined number of times, based on a result detected by the detection unit.

Still preferably, a connection terminal is attached to the vehicle for connecting the external power supply to the electric charging device. The input unit includes a button provided at the connection terminal for unlocking and thus disconnecting the external power supply from the electric charging device, and a detection unit for detecting whether the button has been operated. The control unit performs the second electric charging control when the external power supply is connected to the electric charging device, and, in addition, how may times the button is operated for a predetermined period of time is a predetermined number of times, based on a result detected by the detection unit.

Still preferably, the second electric charging control is performed when the vehicle is shipped from a factory.

Still preferably, the threshold value corresponds to an amount of electric power charged to ensure: first electric power consumed by electronics mounted in the vehicle while the vehicle is stored; and second electric power consumed by the plurality of power storage devices as the plurality of power storage devices self-discharge while the vehicle is stored.

Still preferably, the threshold value corresponds to an amount of electric power charged to ensure the first electric power and the second electric power, and in addition thereto third electric power required to move the vehicle when the vehicle is shipped from the factory.

Still preferably, the threshold value corresponds to an amount of electric power charged when electrically charging the plurality of power storage devices is continued until a period of time elapses that is required to confirm whether the plurality of power storage devices can be normally electrically charged.

The present invention in another aspect provides a vehicular control method for a vehicle including a rotating electric machine serving as a driving source, a plurality of power storage devices for supplying the rotating electric machine with electric power, and an electric charging device for electrically charging the plurality of power storage devices from an external power supply. The plurality of power storage devices are connected in parallel. The method includes the steps of: receiving an instruction; and performing first electric charging control for electrically charging the plurality of power storage devices to have a state of charge to attain an electrically fully charged state when the external power supply is connected to the electric charging device, whereas performing second electric charging control when the external power supply is connected to the electric charging device and in addition an instruction is received to perform the second electric charging control. The second electric charging control is electric charging control using the external power supply to electrically charge the plurality of power storage devices to each have a state of charge equal to a threshold value smaller than an upper limit value set for a state of charge corresponding to the electrically fully charged state.

Advantageous Effects of Invention

Thus in accordance with the present invention when an external power supply is connected to an electric charging device and in addition if an instruction is received to perform second electric charging control, the external power supply is used to perform the second electric charging control to electrically charge a plurality of power storage devices to attain an SOC equal to a threshold value lower than an upper limit value set for an SOC corresponding to an electrically fully charged state so that the batteries may less degrade than when the vehicle is not driven for a long period of time with the power storage devices completely electrically charged to attain the electrically fully charged state. Furthermore, this can also complete electrically charging the batteries in the vehicle faster than when the batteries are electrically charged to attain the electrically fully charged state. A vehicular control device and method can thus be obtained that can prevent further degradation of a battery mounted in a vehicle.

DESCRIPTION OF EMBODIMENTS

Hereinafter reference will be made to the drawings to describe the present invention in embodiments. In the following description, identical components are identically denoted. Their names and functions are also identical. Accordingly, they will not be described repeatedly in detail.

Figure 1:
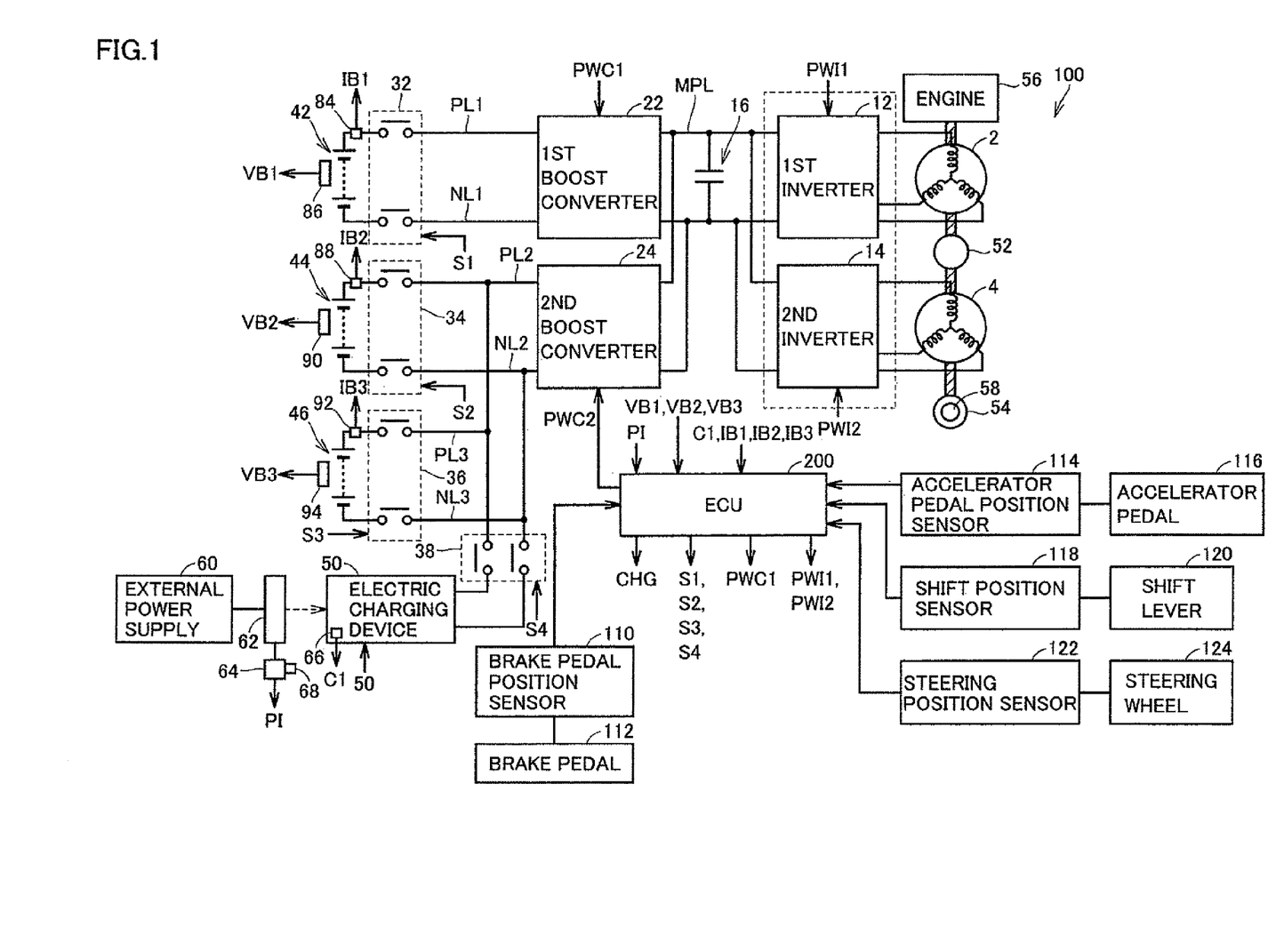
FIG. 1 is a block diagram generally showing a hybrid vehicle having a vehicular control device mounted therein according to an embodiment.

As shown in FIG. 1, a vehicle 100 includes a first motor generator (MG) 2, a second MG 4, a first inverter 12, a second inverter 14, a smoothing capacitor 16, a first boost converter 22, a second boost converter 24, a first system main relay (SMR) 32, a second SMR 34, a third SMR 36, a main battery 42, a first sub battery 44, a second sub battery 46, an electric charging device 50, a power split device 52, a driving wheel 54, an engine 56, a braking device 58, and an electronic control unit (ECU) 200.

In the present embodiment, while vehicle 100 is described as a hybrid vehicle, it is not limited thereto and it may be any vehicle at least having a rotating electric machine as a driving source. Accordingly, vehicle 100 may be an electric vehicle.

First MG 2, second MG 4, and engine 56 are coupled with power split device 52. Vehicle 100 travels with the driving force received from at least one driving source of engine 56 and second MG 4. Engine 56 generates motive power which is in turn divided into two paths by power split device 52. One is a path transmitted to driving wheel 54, and the other is a path transmitted to first MG 2. Driving wheel 54 is provided with braking device 58, and when a brake pedal 112, which will be described later, is depressed, braking device 58 limits the rotation of driving wheel 54.

First MG 2 and second MG 4 are each an alternating current rotating electric machine, and for example, a three-phase alternating rotating electric machine including a rotor having a permanent magnet embedded therein. First MG 2 uses motive power of engine 56 divided by power split device 52 to generate electric power. For example, when main battery 42 has a state of charge (SOC), having a value smaller than a predetermined value, engine 56 starts and first MG 2 generates electric power, which is in turn supplied to main battery 42. Main battery 42 is thus electrically charged with the electric power generated by first MG 2.

Second MG 4 receives electric power from second inverter 14 and uses it to generate driving force which is in turn transmitted to driving wheel 54. Note that when vehicle 100 is braked, driving wheel 54 drives second MG 4 to operate second MG 4 as an electric power generator. Thus, second MG 4 operates as a regenerative brake converting braking energy into electric power. Second MG 4 thus generates electric power which is in turn supplied to the second inverter. The second inverter receives the electric power which is in turn supplied via first boost converter 22 to main battery 42 or via second boost converter 24 to first sub battery 44 or second sub battery 46. Main battery 42, first sub battery 44, or second sub battery 46 is thus electrically charged with the electric power generated by second MG 4.

Power split device 52 is a planetary gear including a sun gear, a pinion gear, a carrier, and a ring gear (not shown). The pinion gear is engaged with the sun gear and the ring gear. The carrier supports the pinion gear rotatably and is also coupled with a crankshaft of engine 56. The sun gear is coupled with a rotation shaft of first MG 2. The ring gear is coupled with a rotation shaft of second MG 4.

First inverter 12 and second inverter 14 are connected in parallel to a main positive bus MPL and a main negative bus MNL. First inverter 12 receives direct current electric power from first boost converter 22 or second boost converter 24, converts it into alternating current electric power, and outputs it to first MG 2. Second inverter 14 receives a direct current from first boost converter 22 or second boost converter 24, converts it into alternating current electric power, and outputs it to second MG 4.

Furthermore, first inverter 12 receives alternating current electric power generated by first MG 2, and first inverter 12 converts it into direct current electric power and outputs it to first boost converter 22 or second boost converter 24. Second inverter 14 receives alternating current electric power generated by second MG 4, and second inverter 14 converts it into direct current electric power and outputs it to first boost converter 22 or second boost converter 24.

Note that first inverter 12 and second inverter 14 are each a bridge circuit including a switching element for three phases, for example. First inverter 12 operates in response to a control signal PWI1 received from ECU 200 to perform a switching operation to drive first MG 2. Second inverter 14 operates in response to a control signal PWI2 received from ECU 200 to perform a switching operation to drive second MG 4.

To ECU 200 are connected a brake pedal position sensor 110, an accelerator pedal position sensor 114, a shift position sensor 118, and a steering position sensor 122.

Brake pedal position sensor 110 senses an amount of an operation of brake pedal 112 (i.e., how much in amount it is depressed). Brake pedal position sensor 110 transmits to ECU 200 a signal indicating how much in amount brake pedal 112 is depressed, as sensed thereby. Note that brake pedal position sensor 110 may be replaced with a switch for sensing whether brake pedal 112 is depressed (or in the on state) or released (or in the off state).

Accelerator pedal position sensor 114 senses an amount of an operation of accelerator pedal 116 (i.e., how much in amount it is depressed). Accelerator pedal position sensor 114 transmits to ECU 200 a signal indicating how much in amount accelerator pedal 116 is depressed, as sensed thereby.

Shift position sensor 118 senses the position of shift lever 120. Shift position sensor 118 transmits to ECU 200 a signal indicating the position of shift lever 120, as sensed thereby.

ECU 200 receives the signal indicating the position of shift lever 120 and therefrom determines a shift position currently selected.

Steering position sensor 122 senses an amount of an operation of steering wheel 124 (i.e., how much in amount it rotates). Steering position sensor 122 transmits to ECU 200 a signal indicating how much in amount steering wheel 124 rotates.

ECU 200 calculates vehicular requested power Ps based on how much in amount brake pedal 112 is depressed, how much in amount accelerator pedal 116 is depressed, a signal sensed by each sensor (not shown), how the vehicle currently travels, and the like, and ECU 200 calculates from the calculated vehicular requested power Ps a targeted torque value and a targeted rotational speed value for first MG 2 and second MG 4. ECU 200 controls first inverter 12 and second inverter 14 to allow first MG 2 and second MG 4 to generate torque and attain rotational speed, as targeted.

Main battery 42, first sub battery 44, and second sub battery 46 are each a rechargeable direct current power supply, and for example, they are each a nickel metal hydride battery, a lithium ion battery or a similar rechargeable battery, a capacitor of a large capacity, or the like.

Main battery 42 is connected to first boost converter 22 with first SMR 32 posed therebetween. First sub battery 44 is connected to second boost converter 24 with second SMR 34 posed therebetween. Second sub battery 46 is connected to second boost converter 24 with third second SMR 36 posed therebetween.

Note that while the present embodiment will be described with main battery 42 and in addition first sub battery 44 and second sub battery 46 serving as two dependent power supplies, it is not limited to two dependent power supplies and may have three or more dependent power supplies.

First SMR 32 operates in response to a control signal S1 received from ECU 200 to switch an electrically conducting state allowing main battery 42 to be electrically connected to first boost converter 22 to a disconnected state allowing main battery 42 to be electrically disconnected from first boost converter 22 or vice versa.

Second SMR 34 operates in response to a control signal S2 received from ECU 200 to switch an electrically conducting state allowing first sub battery 44 to be electrically connected to second boost converter 24 to a disconnected state allowing first sub battery 44 to be electrically disconnected from second boost converter 24 or vice versa.

Third SMR 36 operates in response to a control signal S3 received from ECU 200 to switch an electrically conducting state allowing second sub battery 46 to be electrically connected to second boost converter 24 to a disconnected state allowing second sub battery 46 to be electrically disconnected from second boost converter 24 or vice versa.

In the present embodiment, ECU 200 transmits control signals S2 and S3 to second SMR 34 and third SMR 36 to set one of second SMR 34 and third SMR 36 to the electrically conducting state and the other to the disconnected state.

For example, when second SMR 34 is set to the electrically conducting state and third SMR 36 is set to the disconnected state, first sub battery 44 is electrically connected to second boost converter 24. Accordingly, first sub battery 44 will supply electric power to second boost converter 24.

In contrast, when third SMR 36 is set to the electrically conducting state and second SMR 34 is set to the disconnected state, second sub battery 46 is electrically connected to second boost converter 24. Accordingly, second sub battery 46 will supply electric power to second boost converter 24.

Second SMR 34 and third SMR 36 thus controlled allow a power supply to be selected to supply second boost converter 24 with electric power.

First boost converter 22 and second boost converter 24 are connected in parallel to main positive bus MPL and main negative bus MNL. First boost converter 22 operates in response to a control signal PWC1 received from ECU 200 to perform voltage conversion between main battery 42 and main positive and negative buses MPL and MNL. Second boost converter 24 operates in response to a control signal PWC2 received from ECU 200 to perform voltage conversion between one of first and second sub batteries 44 and 46 and main positive and negative buses MPL and MNL.

Smoothing capacitor 16 is connected between main positive bus MPL and main negative bus MNL, and reduces an electric power variation component included in main positive bus MPL and main negative bus MNL.

Further connected to ECU 200 are a first current sensor 84, a first voltage sensor 86, a second current sensor 88, a second voltage sensor 90, a third current sensor 92, and a third voltage sensor 94.

First current sensor 84 senses a current IB1 flowing from main battery 42 to first boost converter 22 and transmits to ECU 200 a signal representing current IB1 sensed. First voltage sensor 86 senses voltage VB1 of main battery 42 and transmits to ECU 200 a signal representing voltage VB1 sensed.

ECU 200 calculates an SOC of main battery 42 from current IB1 sensed by first current sensor 84 and voltage VB1 sensed by first voltage sensor 86. Note that ECU 200 may calculate the SOC of main battery 42 from current IB1 and voltage VB1 and in addition thereto the temperature of main battery 42. The temperature of main battery 42 is sensed by a temperature sensor (not shown) provided for main battery 42. Furthermore, ECU 200 may calculate the SOC of main battery 42 from open circuit voltage (OCV) or from a charged current and a discharged current, for example.

Second voltage sensor 90 senses a voltage VB2 of first sub battery 44 and transmits to ECU 200 a signal representing voltage VB2 sensed. Second current sensor 88 senses a current IB2 flowing from first sub battery 44 to second boost converter 24 and transmits to ECU 200 a signal representing current IB2 sensed.

ECU 200 calculates an SOC of first sub battery 44 from current IB2 sensed by second current sensor 88 and voltage VB2 sensed by second voltage sensor 90. Note that ECU 200 may calculate the SOC of first sub battery 44 from current IB2 and voltage VB2 and in addition thereto the temperature of first sub battery 44. Note that how the SOC is calculated has been described above and thus will not be described repeatedly in detail.

Third voltage sensor 94 senses a voltage VB3 of second sub battery 46 and transmits to ECU 200 a signal representing voltage VB3 sensed. Third current sensor 92 senses a current IB3 flowing from second sub battery 46 to second boost converter 24 and transmits to ECU 200 a signal representing current IB3 sensed.

ECU 200 calculates an SOC of second sub battery 46 from current IB3 sensed by third current sensor 92 and voltage VB3 sensed by third voltage sensor 94. Note that ECU 200 may calculate the SOC of second sub battery 46 from current IB3 and voltage VB3 and in addition thereto the temperature of second sub battery 46. Note that how the SOC is calculated has been described above and thus will not be described repeatedly in detail.

Note that while the present embodiment has been described with first current sensor 84, second current sensor 88, and third current sensor 92 all sensing a current of a positive electrode line, it is not limited thereto and the sensors may for example sense a current of a negative electrode line.

ECU 200 generates control signals S2 and S3 for sequentially switching and thus using first sub battery 44 and second sub battery 46, and transmits the signals to second SMR 34 and third SMR 36.

For example, when second SMR 34 electrically conducts and third SMR 36 is disconnected to electrically connect first sub battery 44 to second boost converter 24, and if first sub battery 44 also has an SOC decreased below that indicating a predetermined state of charge, ECU 200 generates control signals S2 and S3 to allow second SMR 34 in the electrically conducting state to be electrically disconnected and third SMR 36 in the disconnected state to electrically conduct.

ECU 200 generates control signals PWC1 and PWC2 based on vehicular requested power Ps for controlling first boost converter 22 and second boost converter 24, respectively. ECU 200 transmits the generated control signals PWC1 and PWC2 to first boost converter 22 and second boost converter 24, respectively, to control first boost converter 22 and second boost converter 24.

An electric charging plug 62 connected to external power supply 60 is attached to electric charging device 50 to allow electric power of external power supply 60 to be used to electrically charge one of main battery 42, first sub battery 44, and second sub batteries 46.

Electric charging plug 62 includes a locking mechanism which locks the connection between electric charging device 50 and electric charging plug 62 once the connection has been completed, and a button 68 which moves from an initial position to a predetermined position once the operation of the locking mechanism has been completed. From the fact that button 68 has positionally moved from the initial position to the predetermined position, the user can understand that the locking mechanism has normally operated and that electric charging device 50 has completely been connected to electric charging plug 62. When the user moves button 68 from the predetermined position to the initial position, the locking mechanism unlock the connection between electric charging device 50 and electric charging plug 62. The user can thus remove electric charging plug 62 from electric charging device 50.

Furthermore, button 68 has a switch 64 attached thereto, and when button 68 is moved from the initial position to the predetermined position switch 64 transmits to ECU 200 via electric charging device 50 a signal PI indicating that button 68 has been operated. Switch 64 stops transmitting signal PI when button 68 is moved from the predetermined position to the initial position. Note that switch 64 may transmit signal P1 to ECU 200 when button 68 is moved from the predetermined position to the initial position, and switch 64 may stop transmitting signal P1 when button 68 is moved from the initial position to the predetermined position.

Furthermore, electric charging device 50 is provided with a connection confirmation sensor 66 for sensing that electric charging plug 62 has been connected to electric charging device 50. For example, connection confirmation sensor 66 is an electrical circuit which electrically conducts when electric charging plug 62 is connected to electric charging device 50. Connection confirmation sensor 66 transmits to ECU 200 a signal C1 indicating that electric charging plug 62 has been connected to electric charging device 50.

External power supply 60 is a power supply provided outside vehicle 100 and may for example be a commercial power supply or a similar alternating current power supply.

Electric charging device 50 is connected to each of first sub battery 44 and second sub battery 46 via relay 38 in parallel.

Relay 38 operates in response to a control signal S4 received from ECU 200 to switch an electrically conducting state allowing electric charging device 50 to be electrically connected to first sub battery 44 or second sub battery 46 to a disconnected state allowing electric charging device 50 to be electrically disconnected from first sub battery 44 or second sub battery 46 or vice versa.

When vehicle 100 thus configured has its mounted main battery 42, first sub battery 44 and second sub battery 46 electrically fully charged by external power supply 60, the batteries may thereafter be left in the electrically fully charged state. They may be done so for example when the user does not drive vehicle 100 for a long period of time after the batteries are electrically charged or when vehicle 100 having the batteries electrically charged in a factory shipment stage is thereafter delivered, shipped or the like over a long period of time before the vehicle is received by the user, and the batteries are thus left in the electrically fully charged state for a long period of time and may thus further degrade. Note that the factory shipment stage as referred to herein means a stage in which vehicle 100 produced in a factory is subsequently shipped from the factory.

Figure 2:
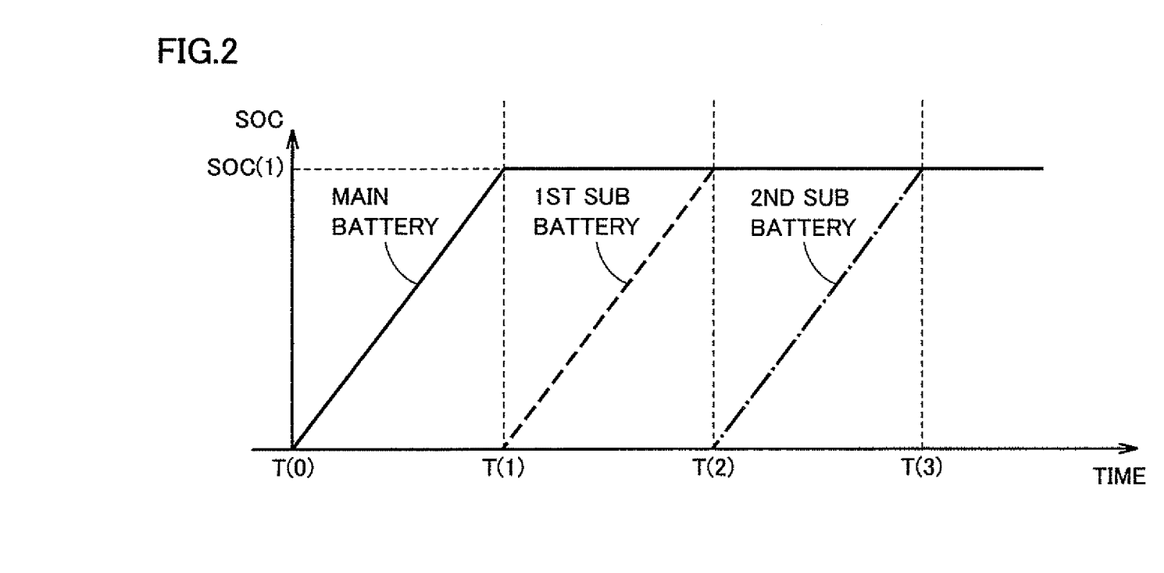
FIG. 2 is a timing plot representing how batteries vary in SOC when an external power supply is used to electrically fully charge all of the batteries.

Furthermore, to electrically charge all the batteries in the factory shipment stage of vehicle 100 to SOC(1) corresponding to the electrically fully charged state, as indicated in FIG. 2, initially, at time T(0), main battery 42 is first electrically charged to attain an SOC equal to SOC(1) corresponding to an upper limit value set for an SOC corresponding to the electrically fully charged state. Note that in FIG. 2, the axis of ordinate represents SOC and the axis of abscissa represents time.

At time T(1), main battery 42 attains an SOC equal to or larger than SOC(1) and electrically charging main battery 42 is thus completed, and in response, first sub battery 44 is then electrically charged to be electrically fully charged.

At time T(2), first sub battery 44 attains an SOC equal to or larger than SOC(1) and electrically charging sub battery 44 is thus completed, and in response, second sub battery 46 is then electrically charged to be electrically fully charged.

At time T(3), second sub battery 46 attains an SOC equal to or larger than SOC(1) and electrically charging second sub battery 46 is thus completed, and electrically charging all of the batteries is thus completed.

Thus completing electrically fully charging all of the batteries may require a long period of time.

Accordingly, in the present embodiment, ECU 200 performs first electric charging control for electrically charging main battery 42, first sub battery 44, and second sub battery 46 to attain an SOC equal to SOC(1) when external power supply 60 is connected to electric charging device 50, and ECU 200 performs second electric charging control rather than the first electric charging control when external power supply 60 is connected to electric charging device 50 and in addition an instruction is input to an input unit to perform the second electric charging control. Note that in the present embodiment, the second electric charging control is electric charging control performed when vehicle 100 is shipped from a factory, and it uses external power supply 60 to electrically charge main battery 42, first sub battery 44 and second sub battery 46 to each attain an SOC equal to a threshold value SOC(2) lower than SOC(1) for shipment. In the following description, the first electric charging control will be referred to as "full electric charging control", and the second electric charging control will be referred to as "shipping electric charging control".

The present embodiment provides an input unit implemented by brake pedal 112 and brake pedal position sensor 110 and ECU 200 performs the shipping electric charging control when external power supply 60 is connected to electric charging device 50 and in addition thereto brake pedal position sensor 110 senses that for a predetermined period of time brake pedal 112 is depressed and released repeatedly a predetermined number of times.

Threshold value SOC(2) corresponds to an amount of electric power charged to main battery 42, first sub battery 44 and second sub battery 46 that corresponds to when vehicle 100 is shipped. Threshold value SOC(2) corresponds to a first amount of electric power charged for example to ensure: the electric power allowing vehicle 100 to be moved and the engine to be started after vehicle 100 is shipped before vehicle 100 is received by a user; and the electric power allowing for a state of charge that is decreased while vehicle 100 is stored (e.g., that decreased as the batteries self-discharge, that consumed while a system of vehicle 100 is inactive, and the like). Alternatively, threshold value SOC(2) corresponds to a second amount of electric power charged when electrically charging main battery 42, first sub battery 44, and second sub battery 46 is continued until a period of time elapses that is required to confirm whether main battery 42, first sub battery 44, and second sub battery 46 can be normally electrically charged. Alternatively, threshold value SOC(2) corresponds to a larger one of the first amount of electric power charged and the second amount of electric power charged.

Figure 3:
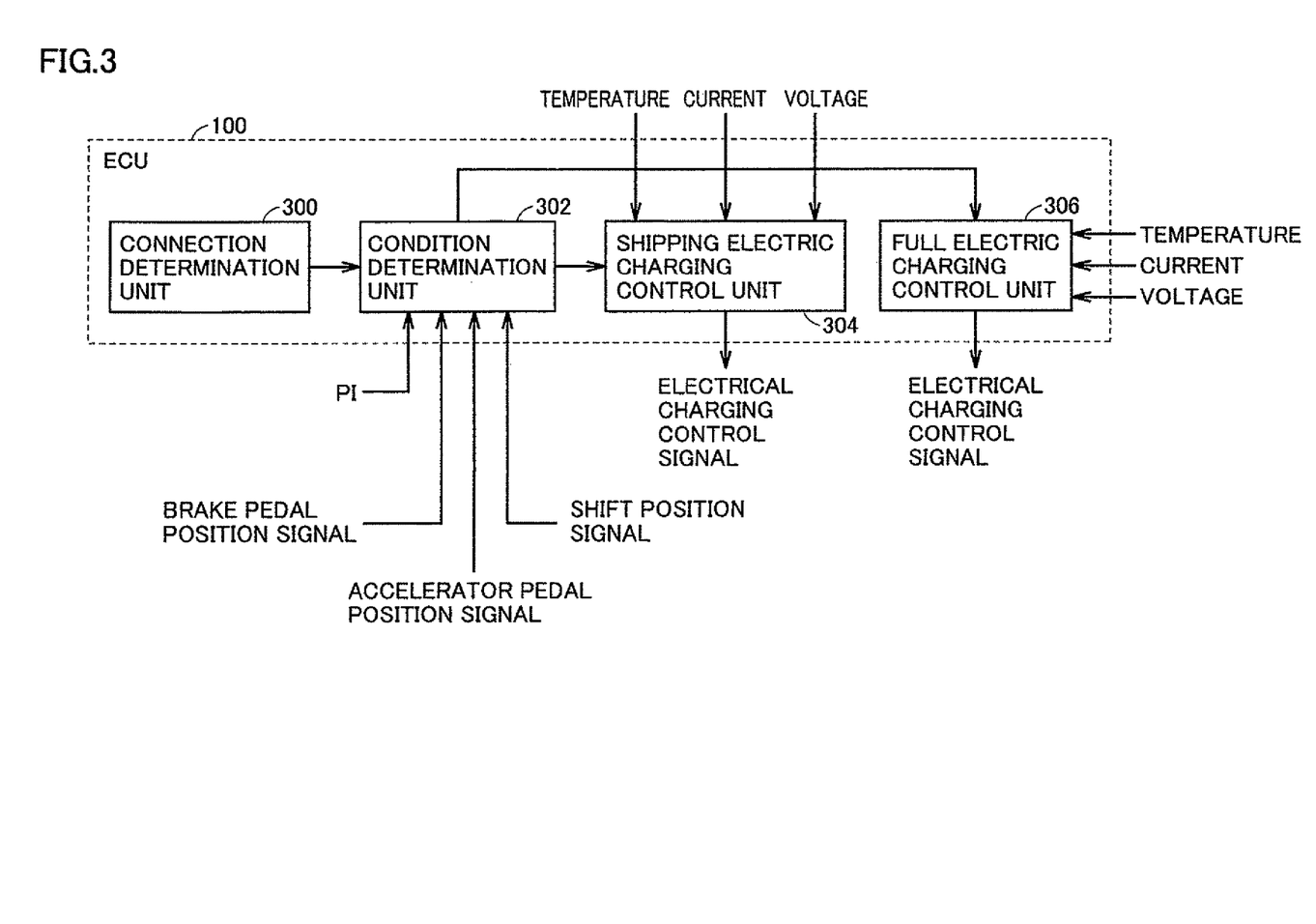
FIG. 3 is a functional block diagram of an ECU serving as the vehicular control device according to the embodiment.

FIG. 3 is a functional block diagram of ECU 200 serving as the vehicular control device according to the present embodiment. ECU 200 includes a connection determination unit 300, a condition determination unit 302, a shipping electric charging control unit 304, and a full electric charging control unit 306.

Connection determination unit 300 determines whether electric charging plug 62 is connected to electric charging device 50. Specifically, if signal C1 is received from connection confirmation sensor 66 indicating that electric charging plug 62 is connected to electric charging device 50, connection determination unit 300 determines that electric charging plug 62 is connected to electric charging device 50. Note that, for example, when connection determination unit 300 determines that electric charging plug 62 is connected to electric charging device 50, connection determination unit 300 may set a connection determination flag on.

When connection determination unit 300 determines that electric charging plug 62 is connected to electric charging device 50, condition determination unit 302 determines whether a condition is established for performing the shipping electric charging control. The condition for performing the shipping electric charging control is such a condition that an instruction has been input to the input unit to perform the shipping electric charging control, as has been set forth above, and specifically it is a condition that for a predetermined period of time brake pedal 112 is depressed and released repeatedly a predetermined number of times.

Note that condition determination unit 302 determines whether the condition for performing the shipping electric charging control is established for example when the connection determination flag is set on, and if condition determination unit 302 determines that the condition for performing the shipping electric charging control has been established, condition determination unit 302 may set a condition determination flag on. Furthermore, for example, condition determination unit 302 may determine whether the condition for performing the shipping electric charging control is established after it is determined that electric charging plug 62 is connected to electric charging device 50 until a predetermined period of time elapses or condition determination unit 302 may determine whether the condition for performing the shipping electric charging control is established after it is determined that electric charging plug 62 is connected to electric charging device 50 until an operation is done to start electrically charging a battery from external power supply 60.

If condition determination unit 302 determines that the condition for performing the shipping electric charging control has been established, shipping electric charging control unit 304 performs the shipping electric charging control. Specifically, shipping electric charging control unit 304 electrically charges main battery 42, first sub battery 44 and second sub battery 46 until main battery 42, first sub battery 44 and second sub battery 46 each attain an SOC equal to threshold value SOC(2) corresponding to an SOC set for shipment.

Threshold value SOC(2) corresponding to the SOC set for shipment is only required for example to have a value smaller than SOC(1) corresponding to the electrically fully charged state. Furthermore, while threshold value SOC(2) corresponding to the SOC set for shipment is described in the present embodiment as a single value shared by main battery 42, first sub battery 44 and second sub battery 46, it is not limited thereto and may be different values for main battery 42, first sub battery 44 and second sub battery 46, respectively. For example, a threshold value for any of main battery 42, first sub battery 44 and second sub batteries 46 that has a large charging capacity may be set to have a value smaller than those for the other batteries. This can prevent a battery having a large charging capacity from being electrically charged for an unnecessarily long period of time.

For example, if it is determined that the condition for performing the shipping electric charging control has been established, shipping electric charging control unit 304 electrically charges main battery 42 to attain an SOC equal to SOC(2) corresponding to the SOC set for shipment. If electric charging device 50 is connected to electric charging plug 62 and the condition for performing the shipping electric charging control has also been established, shipping electric charging control unit 304 holds second SMR 34 and third SMR 36 in the disconnected state and also switches relay 38 and first SMR 32 from the disconnected state to the electrically conducting state. Shipping electric charging control unit 304 activates first boost converter 22, second boost converter 24, and electric charging device 50 to supply electric power from external power supply 60 via electric charging device 50, second boost converter 24, and first boost converter 22 to main battery 42. Main battery 42 thus receiving electric power from external power supply 60 is thus electrically charged.

Shipping electric charging control unit 304 monitors main battery 42 in SOC with reference to current IB1, voltage VB1 and the like, and when main battery 42 attains an SOC equal to or larger than SOC(2) corresponding to the SOC set for shipment, shipping electric charging control unit 304 completes electrically charging main battery 42. At the time, shipping electric charging control unit 304 inactivates first boost converter 22, second boost converter 24 and electric charging device 50 and switches first SMR 32 from the electrically conducting state to the disconnected state.

After electrically charging main battery 42 is thus completed, shipping electric charging control unit 304 electrically charges first sub battery 44 to attain an SOC equal to SOC(2) corresponding to the SOC set for shipment. Shipping electric charging control unit 304 holds first SMR 32 and third SMR 36 in the disconnected state and also switches second SMR 34 from the disconnected state to the electrically conducting state. Shipping electric charging control unit 304 activates electric charging device 50 to supply electric power to first sub battery 44 from external power supply 60 via electric charging device 50. First sub battery 44 thus receiving electric power from external power supply 60 is thus electrically charged.

Shipping electric charging control unit 304 monitors first sub battery 44 in SOC with reference to current IB2, voltage VB2 and the like, and when first sub battery 44 attains an SOC equal to or larger than SOC(2) corresponding to the SOC set for shipment, shipping electric charging control unit 304 completes electrically charging first sub battery 44. At the time, shipping electric charging control unit 304 inactivates electric charging device 50 and switches second SMR 34 from the electrically conducting state to the disconnected state.

After electrically charging first sub battery 44 is thus completed, shipping electric charging control unit 304 electrically charges second sub battery 46 to attain an SOC equal to SOC(2) corresponding to the SOC set for shipment. Shipping electric charging control unit 304 holds first SMR 32 and second SMR 34 in the disconnected state and also switches third SMR 36 from the disconnected state to the electrically conducting state. Shipping electric charging control unit 304 activates electric charging device 50 to supply electric power to second sub battery 46 from external power supply 60 via electric charging device 50. Second sub battery 46 thus receiving electric power from external power supply 60 is thus electrically charged.

Shipping electric charging control unit 304 monitors second sub battery 46 in SOC with reference to current IB3, voltage VB3 and the like, and when second sub battery 46 attains an SOC equal to or larger than the threshold value SOC for shipment, shipping electric charging control unit 304 completes electrically charging second sub battery 46. At the time, shipping electric charging control unit 304 inactivates electric charging device 50 and switches third SMR 36 from the electrically conducting state to the disconnected state.

Note that shipping electric charging control unit 304 may perform the shipping electric charging control for example when the connection determination flag and the condition determination flag are both set on.

Furthermore while in the present embodiment shipping electric charging control unit 304 first completes electrically charging main battery 42 and thereafter starts electrically charging first sub battery 44 and after shipping electric charging control unit 304 completes electrically charging first sub battery 44 shipping electric charging control unit 304 then starts electrically charging secondسub battery 46, the batteries may be electrically charged in an order other than that described above.

When condition determination unit 302 determines that the condition for performing the shipping electric charging control is not established, full electric charging control unit 306 performs the full electric charging control.

Note the full electric charging control is different from the shipping electric charging control only in that whether electrically charging a battery is completed is determined with reference to a threshold value that corresponds to the electrically fully charged state, or threshold value SOC(1). The remainder in the electrically charging operation is similar to that in the shipping electric charging control. Accordingly, it will not be described repeatedly in detail.

While in the present embodiment, connection determination unit 300, condition determination unit 302, shipping electric charging control unit 304, and full electric charging control unit 306 all function as software implemented by ECU 200's CPU executing a program stored in the memory, they may be implemented by hardware. Note that the program is stored in a storage medium and thus mounted in the vehicle.

Figure 4:
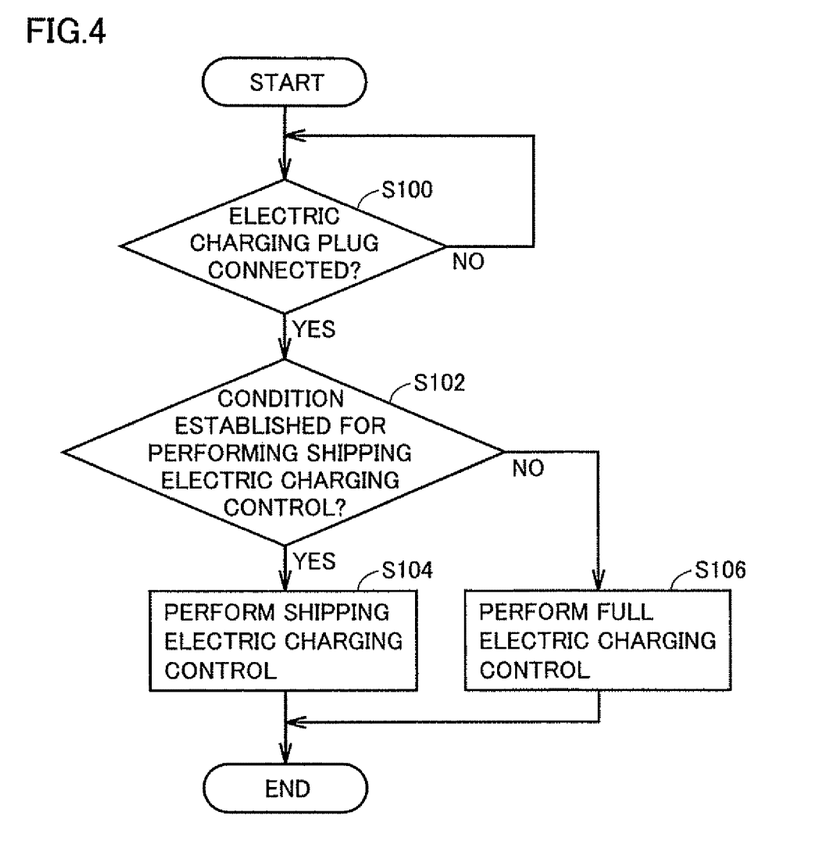
FIG. 4 is a flowchart indicating a structure to control a program executed by the ECU serving as the vehicular control device according to the embodiment.

Reference will be made to FIG. 4 to describe a structure to control a program executed by ECU 200 serving as the vehicular control device according to the present embodiment.

At Step (S) 100, ECU 200 determines whether electric charging plug 62 has been connected. If so (YES at S100), the control proceeds to S102. Otherwise (NO at S100), the control returns to S100.

At S102, ECU 200 determines whether the condition for performing the shipping electric charging control is established. If so (YES at S102), the control proceeds to S104. Otherwise (NO at S102), the control proceeds to S106.

At S104, ECU 200 performs the shipping electric charging control. At S106, ECU 200 performs the full electric charging control. Note that the shipping electric charging control and the full electric charging control are as has been described previously, and accordingly, will not be described repeatedly in detail.

Figure 5:
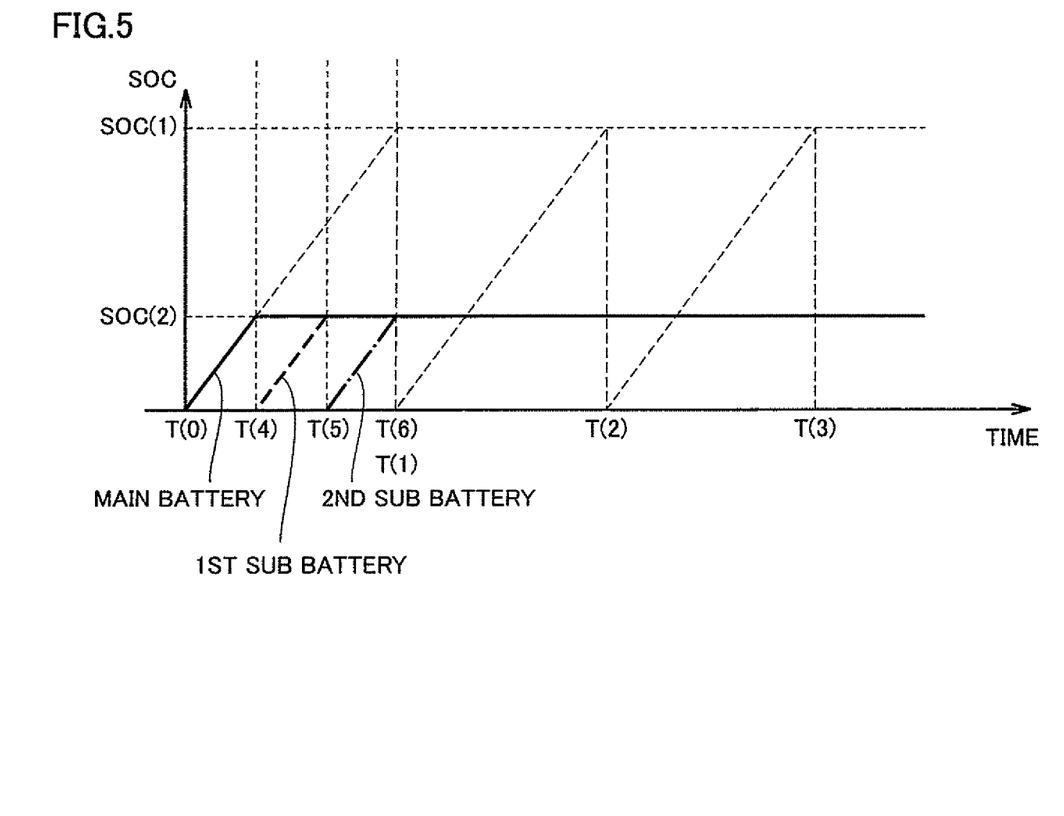
FIG. 5 is a timing plot representing an operation of the ECU serving as the vehicular control device according to the embodiment.

In accordance with the above structure and flowchart, the vehicular control device of the present embodiment, or ECU 200, operates, as will be described hereinafter with reference to FIG. 5.

When vehicle 100 is in the shipment stage, an operator attaches electric charging plug 62 to vehicle 100 (YES at S100), and subsequently if brake pedal 112 is depressed and released repeatedly a predetermined number of times for a predetermined period of time, i.e., the condition for performing the shipping electric charging control is established (YES at S102), then, at time T(0) the shipping electric charging control is performed (S104).

More specifically, initially, main battery 42 is first electrically charged and at time T(4) main battery 42 attains an SOC equal to SOC(2) corresponding to the SOC set for shipment and accordingly, electrically charging main battery 42 is completed.

Once electrically charging main battery 42 has been completed, first sub battery 44 is then electrically charged. At time T(5), first sub battery 44 attains an SOC equal to threshold value SOC(2), and electrically charging first sub battery 44 is accordingly completed.

Once electrically charging first sub battery 44 has been completed, second sub battery 46 is then electrically charged. At time T(6), second sub battery 46 attains an SOC equal to SOC(2), and electrically charging second sub battery 46 is accordingly completed. Time T(0) to time T(6) is a period of time shorter than a period of time consumed by the MI electric charging control to complete electrically charging all of the batteries (i.e., time T(0) to time T(3)).

In contrast, electric charging plug 62 is attached (YES at S100) and thereafter if the condition for performing the shipping electric charging control is not established (NO at S102), the full electric charging control is performed (S106).

At the time, how the SOC varies is similar to that indicated in FIG. 2, and accordingly, will not be described repeatedly in detail.

Thus the present embodiment provides such a vehicular control device that when an external power supply is connected to an electric charging device and in addition if an instruction is input to an input unit to perform second electric charging control, the external power supply is used to electrically charge a main battery, a first sub battery and a second sub battery to attain an SOC equal to threshold value SOC(2) lower than SOC(1) corresponding to an upper limit value set for an SOC corresponding to the electrically fully charged state so that the batteries may less degrade than when the vehicle is not driven for a long period of time with the batteries completely electrically charged to attain the electrically fully charged state. Furthermore, this can also complete electrically charging the batteries in the vehicle faster than when the batteries are electrically charged to all attain the electrically fully charged state. A vehicular control device and method can thus be provided that can prevent further degradation of the batteries mounted in the vehicle.

Furthermore, the second electric charging control is not performed only when vehicle 100 is shipped from a factory. For example, the user may depress the brake pedal to establish the condition for performing the second electric charging control, and accordingly an external power supply may be used to electrically charge all batteries to attain an SOC equal to threshold value SOC(2) lower than SOC(1) corresponding to the upper limit value set for the SOC corresponding to the electrically fully charged state. For example when the user does not drive the vehicle for a long period of time, the main battery, the first sub battery and the second sub battery can all be prevented from being left in the electrically fully charged state for the long period of time. This can prevent further degradation of the batteries. In that case, it is desirable to set threshold value SOC(2) to maintain an SOC to ensure the electric power consumed by a system of vehicle 100 and self-discharged electric power and also reduce the batteries' degradation for a period of time for which the user does not intend to drive the vehicle.

Alternatively, the shipping electric charging control and the electric charging control performed when the user does not drive vehicle 100 for a long period of time may be performed with reference to different threshold values SOC (2) set differently, or the two types of control may be performed for different conditions, respectively. For example, the former may be performed when the electric charging plug 62 button 68 is operated more than a predetermined number of times, whereas the latter may be performed when brake pedal 112 is operated more than a predetermined number of times. How the threshold value for the former and that for the latter are set is as has been described previously, and accordingly, will not be described repeatedly in detail.

While the present embodiment has been described with an input unit including brake pedal position sensor 110 and brake pedal 112, it is not limited thereto. For example, the input unit may include button 68 of electric charging plug 62 and switch 64 and ECU 200 may perform the second electric charging control when external power supply 60 is connected to electric charging device 50 and if switch 64 is turned on/off (or signal PI is received) a predetermined number of times for a predetermined period of time.

This can not only reduce the batteries' degradation and promote completing electrically charging the batteries but also allows an operator in a factory to perform an operation without getting in vehicle 10, i.e., outside vehicle 10, to perform the shipping electric charging control for efficient workability.

Alternatively, the input unit may include an operation member such as a button of an air-conditioner, a navigation system, an audio system and/or the like, and a switch which transmits to ECU 200 a signal indicating whether the button has been pressed, as sensed.

Alternatively, the input unit may include: accelerator pedal position sensor 114 and accelerator pedal 116; shift position sensor 118 and shift lever 120; or steering position sensor 122 and steering wheel 124.

Figure 6:
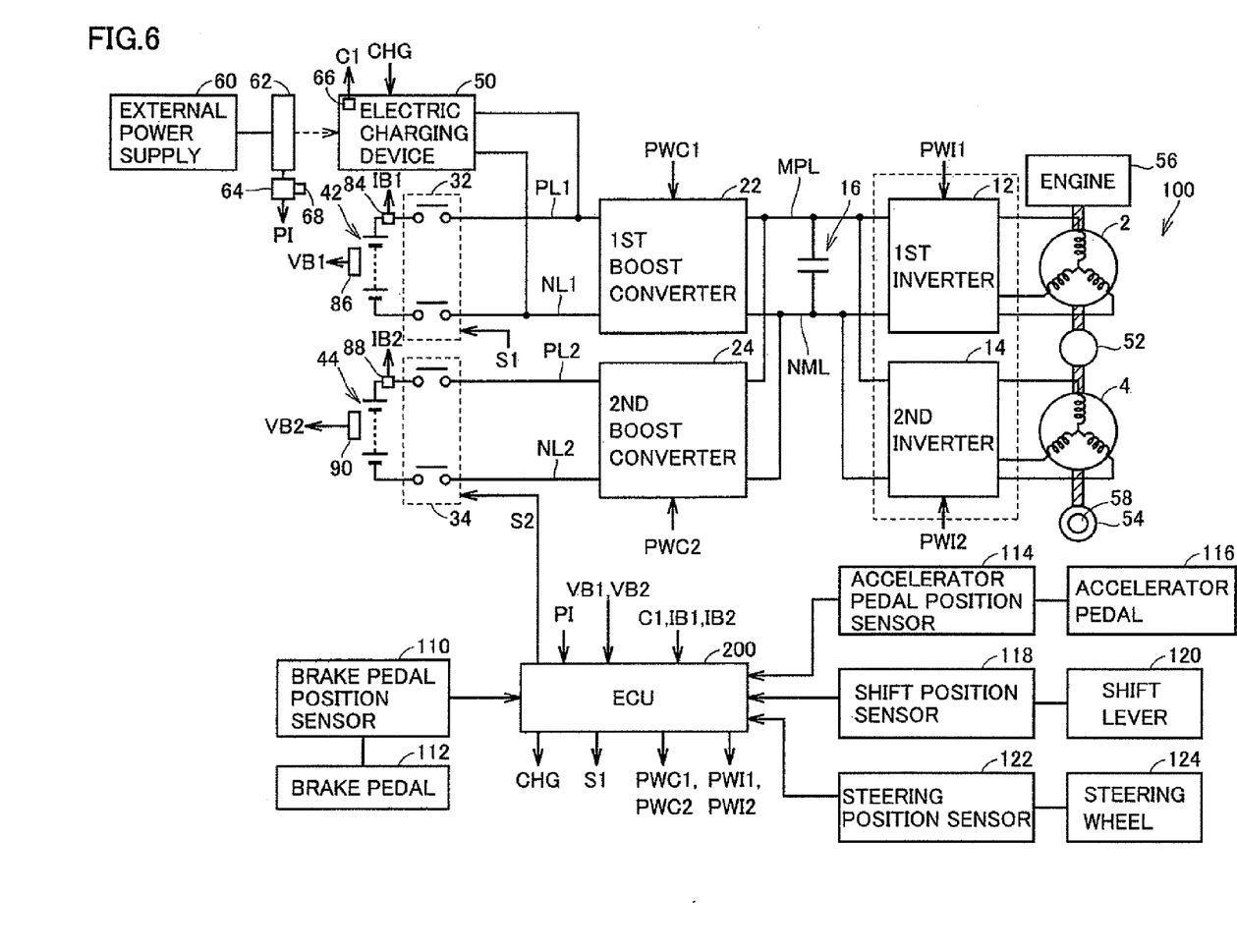
FIG. 6 is a block diagram generally showing a hybrid vehicle to which the present invention is applicable.

Furthermore, vehicle 100 is not limited in configuration to that shown in FIG. 1, and it may be configured as shown in FIG. 6 for example.

The FIG. 6 vehicle 100 is different from the FIG. 1 vehicle 100 in that electric charging device 50 is connected to the first boost converter in parallel and that relay 38, second sub battery 46, and third SMR 36 are not provided. The remainder in configuration is similar to that of the FIG. 1 vehicle 100, and accordingly, will not be described repeatedly in detail.

In the FIG. 6 vehicle 100, when main battery 42 is electrically charged, first SMR 32 is switched from the disconnected state to the electrically conducting state and electric charging device 50 is also activated, and second SMR 32 is held disconnected and first boost converter 22 and second boost converter 24 is held inactivated. Once electrically charging main battery 42 has been completed, first SMR 32 is switched from the electrically conducting state to the disconnected state and electric charging device 50 is inactivated.

Furthermore, when first sub battery 44 is electrically charged, second SMR 34 is switched from the disconnected state to the electrically conducting state and first boost converter 22, second boost converter 24, and electric charging device 50 are activated, and first SMR 32 is held disconnected. Once electrically charging first sub battery 44 has been completed, second SMR 34 is switched from the electrically conducting state to the disconnected state and first boost converter 22, second boost converter 24, and electric charging device 50 are inactivated.

Such a configuration with the invention of the present embodiment applied thereto also presents an effect similar to that of the FIG. 1 vehicle 100 with the invention of the present embodiment applied thereto. Accordingly, it will not be described repeatedly in detail.

Furthermore, in the FIG. 6 vehicle 100, ECU 200 may switch both first SMR 32 and second SMR 34 from the disconnected state to the electrically conducting state and activate first boost converter 22, second boost converter 24 and electric charging device 50 to electrically charge main battery 42 and first sub battery 44 concurrently.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST 2, 4: MG; 12, 14: inverter; 16: smoothing capacitor; 22, 24: boost converter; 32, 34, 36: SMR; 38: relay; 42: main battery; 44, 46: sub battery; 50: electric charging device; 52: power split device; 54: driving wheel; 56: engine; 58: braking device; 60: external power supply; 62: electric charging plug; 64: switch; 66: connection confirmation sensor; 84, 88, 92: current sensor; 86, 90, 94: voltage sensor; 100: vehicle; 110: brake pedal position sensor; 112: brake pedal; 114: accelerator pedal position sensor; 116: accelerator pedal; 118: shift position sensor; 120: shift lever; 122: steering position sensor; 124: steering wheel; 200: ECU; 300: connection determination unit; 302: condition determination unit; 304: shipping electric charging control unit; 306: full electric charging control unit.

The invention claimed is:

1. A vehicular control device for use in a vehicle by a user, the vehicle including: (i) a rotating electric machine configured as a driving source, (ii) a plurality of power storage devices for supplying said rotating electric machine with electric power, and (iii) an electric charging device configured to electrically charge said plurality of power storage devices from an external power supply, said plurality of power storage devices being connected in parallel, the vehicular control device comprising:
an input device configured to input an instruction of the user of said vehicle based on an operation to any one of: (1) a brake pedal, (2) an acceleration pedal, and (3) a steering wheel; and
an electronic control unit configured to perform:
a first electric charging control for electrically charging said plurality of power storage devices to have a state of charge to attain an electrically fully charged state in response to connecting said external power supply to said electric charging device, and
a second electric charging control in response to connecting said external power supply to said electric charging device and receiving an instruction from the input device by the user to perform said second electric charging control, said second electric charging control including electrically charging each power storage device by the external power supply to have a state of charge equal to a threshold value smaller than an upper limit value set for a state of charge corresponding to said electrically fully charged state.

2. The vehicular control device according to claim 1, wherein
when: (i) said external power supply is connected to said electric charging device and (ii) said instruction is input to said input device for performing said second electric charging control, said electronic control unit electrically charges a first power storage device of said plurality of power storage devices via said external power supply, and
when said first power storage device attains a state of charge equal to or larger than said threshold value, said electronic control unit electrically charges a second power storage device different from said first power storage device to attain a state of charge equal to or larger than said threshold value via said external power supply.

3. The vehicular control device according to claim 1, wherein:
said input device includes:
a detector configured to detect an amount of an operation of said brake pedal; and
said electronic control unit performs said second electric charging control when: (i) said external power supply is connected to said electric charging device, and (ii) the brake pedal is depressed and released for a predetermined number of times within a predetermined period of time as detected by the detector.

4. The vehicular control device according to claim 1, wherein:
  a connection terminal is attached to said vehicle for connecting said external power supply to said electric charging device;
  said input device includes:
    a button provided at said connection terminal for unlocking and thus disconnecting said external power supply from said electric charging device, and
    a detector for detecting whether said button has been operated; and
  said electronic control unit performs said second electric charging control in response to: (i) said external power supply is connected to said electric charging device, and (ii) how many times said button is operated within a predetermined period of time for a predetermined number of times, based on a result detected by said detector.

5. The vehicular control device according to claim 1, wherein said second electric charging control is performed when said vehicle is shipped from a factory.

6. A vehicular control method for use in a vehicle by a user, the vehicle including: (i) a rotating electric machine configured as a driving source, (ii) a plurality of power storage devices configured to supply said rotating electric machine with electric power, and (iii) an electric charging device configured to electrically charge said plurality of power storage devices from an external power supply, said plurality of power storage devices being connected in parallel, the method comprising the steps of:
  receiving an instruction from the user of said vehicle based on an operation to any one of: (1) a brake pedal, (2) an acceleration pedal, and (3) a steering wheel; and
  performing a first electric charging control for electrically charging said plurality of power storage devices to have a state of charge corresponding to an electrically fully charged state in response to connecting said external power supply to said electric charging device, and
  performing a second electric charging control in response to the external power supply being connected to said electric charging device and receiving an instruction from the user to perform said second electric charging control, said second electric charging control including electrically charging each power storage device by the external power supply to have a state of charge equal to a threshold value smaller than an upper limit value set for a state of charge corresponding to said electrically fully charged state.

\* \* \* \* \*